(12) United States Patent
Gu et al.

(10) Patent No.: US 8,728,296 B2
(45) Date of Patent: May 20, 2014

(54) METHOD FOR EXTRACTING GALLIUM FROM FLY ASH

(75) Inventors: Dazhao Gu, Beijing (CN); Yinshan Jiang, Beijing (CN); Cundi Wei, Beijing (CN); Jianguo Han, Beijing (CN); Deli Yu, Beijing (CN); Zhaohua Guo, Beijing (CN); Yixin Zhao, Beijing (CN); Ping Zou, Beijing (CN); Chunbin Guo, Beijing (CN)

(73) Assignee: China Shenhua Energy Company Limited, Beijing (CN)

( * ) Notice: Subject to any disclaimer, the term of this patent is extended or adjusted under 35 U.S.C. 154(b) by 0 days.

(21) Appl. No.: 13/643,385

(22) PCT Filed: Apr. 27, 2011

(86) PCT No.: PCT/CN2011/073392
§ 371 (c)(1),
(2), (4) Date: Dec. 10, 2012

(87) PCT Pub. No.: WO2011/134402
PCT Pub. Date: Nov. 3, 2011

(65) Prior Publication Data
US 2013/0081954 A1    Apr. 4, 2013

(30) Foreign Application Priority Data

Apr. 27, 2010   (CN) .......................... 2010 1 0161840

(51) Int. Cl.
*C25C 1/22*   (2006.01)
*C22B 58/00*  (2006.01)

(52) U.S. Cl.
USPC ....................................................... 205/564

(58) Field of Classification Search
CPC .......... C25C 1/22; C22B 7/006; C22B 7/007; C22B 7/02; C22B 3/0098; C22B 3/04; C22B 58/00
USPC ....................................................... 205/564
See application file for complete search history.

(56) References Cited

U.S. PATENT DOCUMENTS 3,540,860 A * 11/1970 Cochran ...................... 252/79.2
4,421,615 A * 12/1983 Yamada et al. ............... 205/564

(Continued)

FOREIGN PATENT DOCUMENTS

| CN | 101284668 A | 10/2007 |
| CN | 101117662 A | 2/2008 |

(Continued)

OTHER PUBLICATIONS

Alexandratos. "Ion-Exchange Resins: A Retrospective from Industrial and Engineering Chemistry Research". I&EC Research. Jan. 2009. pp. 388-398.*

(Continued)

*Primary Examiner* — Nicholas A Smith
*Assistant Examiner* — Ciel Thomas
(74) *Attorney, Agent, or Firm* — Renner, Otto, Boisselle & Sklar, LLP

(57) ABSTRACT

Disclosed is a method for extracting gallium from fly ash, which comprises the following steps: crushing the fly ash and removing Fe by magnetic separation; then dissolving it by using hydrochloric acid to obtain hydrochloric acid leachate; adsorbing gallium contained in the hydrochloric acid leachate with macro-porous cationic resin, followed by eluting to obtain an eluent containing gallium; adding masking agent to mask ferric ion to obtain an eluent containing gallium after masking; adsorbing gallium in the eluent containing gallium after masking with macro-porous cationic resin, followed by eluting to obtain a secondary eluent; adding sodium hydroxide solution into the secondary eluent to react; filtering and removing precipitates after reaction, and then concentrating the filtrate and electrolyzing to obtain metal gallium. The method simplifies the process and improves extraction efficiency of gallium.

22 Claims, 2 Drawing Sheets

(56) References Cited

U.S. PATENT DOCUMENTS

| | | | |
|---|---|---|---|
| 4,865,823 A * | 9/1989 | Minagawa et al. | 423/112 |
| 4,999,171 A * | 3/1991 | Kato et al. | 423/112 |
| 5,030,427 A * | 7/1991 | Monzyk | 423/112 |
| 5,035,365 A * | 7/1991 | Birmingham | 241/14 |
| 5,092,987 A * | 3/1992 | Schickel | 209/223.1 |
| 5,176,886 A * | 1/1993 | Darnall et al. | 423/29 |
| 2005/0065060 A1* | 3/2005 | Kin et al. | 510/506 |
| 2008/0160540 A1* | 7/2008 | Buechler et al. | 435/7.1 |

FOREIGN PATENT DOCUMENTS

| | | | | |
|---|---|---|---|---|
| CN | 101130835 A | | 3/2008 | |
| CN | 101255504 A | | 9/2008 | |
| CN | 201179479 Y | * | 1/2009 | B03C 1/02 |
| CN | 101368231 A | | 2/2009 | |
| CN | 201413678 Y | * | 2/2010 | H01B 7/08 |
| CN | 101838738 A | | 9/2010 | |
| JP | 60-215721 A | | 10/1985 | |

OTHER PUBLICATIONS

Ren et al., "Processing weak-magnetic iron ores from Longyan Mines with SLon pulsating magnetic separator", Southern Metals, Dec. 2007, Sum. 159, pp. 15-18 (English translation of abstract).

Wang et al., "Study on the Adsorption of Gallium by Macro-Porous Phosphoric Acid Resin", Journal of Hangzhou University, Oct. 1986, vol. 13, No. 4, pp. 456-460 (English translation of Abstract).

International Search Report for corresponding International Application No. PCT/CN2011/073392 mailed Aug. 4, 2011 and English translation.

Written Opinion of the International Searching Authority for corresponding International Application No. PCT/CN2011/073392 mailed Aug. 4, 2011 and English translation.

International Preliminary Report on Patentability for corresponding International Application No. PCT/CN2011/073392 mailed Jul. 27, 2012 and English translation.

* cited by examiner

METHOD FOR EXTRACTING GALLIUM FROM FLY ASH

This application is a national phase of International Application No. PCT/CN2011/073392 filed Apr. 27, 2011 and claims priority to Chinese Application No. 201010161840.8 filed Apr. 27, 2010.

TECHNICAL FIELD

The present invention relates to a method for extracting metal gallium from fly ash and in particular relates to a method for extracting metal gallium from circulating fluidized-bed fly ash.

BACKGROUND

Gallium is an important semiconductor material and widely used. The price of gallium is very high in the international market and thus gallium has a bright prospect. However, the reserve of gallium is low, only approximately 0.015% in the earth's crust. Gallium almost does not form minerals, but exists with other minerals in form of isomorphism. Therefore, extraction of gallium is considerably difficult. Gallium is often found in conjunction with aluminum and zinc in minerals in nature. As such, sulfide deposits of zinc and bauxite ore serve as a primary source of the extraction of gallium. Nowadays, more than 90% of gallium in the world is extracted from the by-product of alumina industry in which bauxite is used as a main raw material. The mother liquid used for the enrichment and separation of gallium is the mother liquid obtained from carbon precipitation (or seed precipitation) during the process for producing alumina. The main component of such mother liquid obtained from carbon precipitation (or seed precipitation) is a base sodium metaaluminate solution containing gallium. Main methods for extracting gallium from such base solution include a method for removing aluminum via lime cream and carbonation, method of Carbonated lime milk two-stage decomposition method, precipitation method and resin adsorption method which develops in recent years.

The recent studies have shown that the fly ash obtained from some places contains a large amount of gallium which even overpasses the gallium level of mineral deposit. It has been verified by researches that the gallium content in the fly ash is usually 12-230 µg/g. As compared with the gallium contents of other resources, the fly ash deserves to be extracted for metal gallium as a raw material. In light of different conditions of calcinations, the fly ash is classified into pulverized coal-fired boiler fly ash and circulating fluidized-bed fly ash. The pulverized coal-fired boiler fly ash is produced when coal is burned at a very high temperature (1400-1600° C.), in which alumina is in glassy state or present as a mineral form of mullite crystals or corundum crystals of hot aluminum mineral which make such alumina very stable. While the combustion temperature of circulating fluidized-bed fly ash is much lower than that of traditional pulverized coal-fired boiler fly ash, only about 850° C. Different combustion temperatures make a substantial difference in phase composition between the pulverized coal-fired boiler fly ash and circulating fluidized-bed fly ash, that is, amorphous kaolinite enters into the main phase composition of the circulating fluidized-bed fly ash, in which silicon dioxide, alumina and ferric oxide or the like possess excellent activity.

CN 200810051209.5 discloses a method for extracting both alumina and gallium from fly ash. In the method, sodium metaaluminate solution containing gallium is obtained by acid-leaching and alkali-leaching processes, and then gallium is enriched and separated via multiple-stage carbon precipitation-sodium hydroxide dissolution process.

CN 200710065366.7 discloses a method for extracting silicon dioxide, alumina and gallium oxide from high-alumina fly ash. The method comprises steps of treating the residues produced after the extraction of silicon dioxide from fly ash to obtain sodium metaaluminate solution containing gallium, using such solution as the mother liquid to enrich gallium via multiple-stage carbon precipitation-sodium hydroxide dissolution process and resin adsorption process.

CN 200710145132.3 discloses a method for co-producing gallium and alumina. The method comprises steps of treating fly ash to obtain sodium metaaluminate solution containing gallium, enriching gallium by the Bayer dissolving system and then separating the enriched gallium by adsorption process using chelating resin.

CN 200710141488.X discloses a method for producing gallium. The intermediate product, i.e. mother liquid of carbon precipitation, obtained from the process for producing alumina from fly ash is used as a raw material and reacts with sodium bicarbonate, and then subjects to a thorough carbonation, so as to obtain a gallium concentrate.

In the above patent documents, the mother liquid of carbon precipitation (or seed precipitation) obtained from the process for producing alumina from fly ash is used as a raw material for the enrichment and separation of gallium, that is, the mother liquid used for extracting gallium is a base sodium metaaluminate solution containing gallium.

CN 200810017872.3 discloses a process for extracting gallium from fly ash and coal gangue. In the process, an adsorption method via absorbent columns is used for extracting gallium from an aluminum chloride solution containing gallium which is obtained by mixing fly ash and sodium carbonate, subjecting the mixture to calcination followed by water leaching and carbon precipitating and then reacting with hydrochloric acid. Such process, as fly ash and sodium carbonate are mixed and calcined at a very high temperature before acid leaching, is suitable for extracting gallium from pulverized coal-fired boiler fly ash which has weak activity.

Jiazhen He et al. has reported "a research on technique of recycling gallium from fly ash" (Scientific Research, 2002, No. 5, p23-26), in which the fly ash reacts directly with hydrochloric acid to yield an aluminum chloride solution containing gallium, without being calcined at a very high temperature, and then gallium is extracted by resin adsorption. The reaction temperature of the fly ash and hydrochloric acid is low (60° C.), which makes the leaching efficiency of gallium very low (35.2%). Moreover, the resin for extraction used in the method is levextrel resin (CL-TBP). The adsorption principle of such resin is similar to that of solvent extraction. Such resin is obtained by copolymerizing and curing the active group of an extraction agent with the base resin. Consequently, the adsorption efficiency of the resin is very low and the production cost is very high.

SUMMARY OF THE INVENTION

The object of the invention is to provide an improved method for extracting metal gallium from circulating fluidized-bed fly ash.

The method for extracting metal gallium from circulating fluidized-bed fly ash according to the invention comprises the following steps:

a) crushing the fly ash to a size of 100 mesh or smaller, removing iron by wet magnetic separation such that the ferric oxides content in the fly ash is reduced to 1.0 wt % or less, then adding hydrochloric acid into the de-ironed fly ash for an acid-leaching reaction, and subjecting the reaction product to solid-liquid separation, so as to yield a hydrochloric leachate having a pH value in the range of 1-3;

b) adsorbing gallium in the hydrochloric leachate by passing the same through a column loaded with a macro-porous cationic resin; eluting the column with water or hydrochloric acid as an eluting agent when the adsorption reaches saturation to obtain a gallium-containing eluent;

c) masking ferric ions in the gallium-containing eluent by a masking agent followed by passing the masked eluent through the column loaded with macro-porous cationic resin; eluting the column with water or hydrochloric acid as an eluting agent when the adsorption reaches saturation to obtain a second eluent; and d) adding an alkali solution into the second eluent, removing precipitates by filtering after reaction, and concentrating the filtrate till both gallium content and sodium hydroxide content are 1 mol/l or more, then electrolyzing the concentrated filtrate to obtain metal gallium.

Hereinafter the method according to the invention will be further described in detail, but the present invention is not limited thereto.

In step a) according to an embodiment of the invention, the fly ash includes, but is not limited to circulating fluidized-bed fly ash. In light of particle size distribution of the fly ash, the fly ash is crushed to a size of 100 mesh or smaller, removing iron contained in the crushed fly ash before the acid-leaching, such that the iron content in the fly ash is reduced to 1.0 wt % or less. The methods for removing iron may be any conventional methods for removing iron, such as magnetic separation. Preferably, wet magnetic separation is used in the present invention. Any conventional magnetic separator suitable for removing iron from powder-like material may be used for the wet magnetic separation in the present invention, as long as the iron content of the fly ash can be reduced to 1.0 wt % or less. The iron content in the fly ash is calculated on the basis of the weight of the dried fly ash containing no water.

Preferably, the magnetic separator used for fly ash is a vertical ring magnetic separator. Further preferably, the vertical ring magnetic separator comprises a rotating ring, an inductive medium, an upper iron yoke, a lower iron yoke, a magnetic exciting coil, a feeding opening, a tailing bucket and a water washing device, in which the feeding opening is used for feeding the coal ash to be de-ironed, the tailing bucket is used for discharging the non-magnetic particles after de-ironing, the upper iron yoke and the lower iron yoke are respectively arranged at the inner and outer sides of the lower portion of the rotating ring, the water washing device is arranged above the rotating ring, the inductive medium is arranged in the rotating ring, the magnetic exciting coil is arranged at the periphery of the upper iron yoke and the lower iron yoke so as to make the upper iron yoke and the lower iron yoke to be a pair of magnetic poles for generating a magnetic field in the vertical direction, and the inductive medium is layers of steel plate meshes, each steel plate mesh is woven by wires, and the edges of the wires have ridge-like sharp angles.

Preferably, the upper iron yoke and the lower iron yoke are formed integrally, and are arranged, in a plane perpendicular to the rotating ring, to surround the inner and outer sides of the lower portion of the rotating ring.

Preferably, the vertical ring magnetic separator further comprises a pressure balance chamber water jacket disposed adjacent to the magnetic exciting coil.

Preferably, the steel plate mesh is made of 1Cr17.

Preferably, the magnetic exciting coil is a flat wire solenoid coil which is aluminum coated by varnish and doubly enwrapped by fiberglass.

Preferably, the steel plate mesh has a medium layer spacing of 2-5 mm. More preferably, the steel plate mesh has a medium layer spacing of 3 mm.

Preferably, the steel plate mesh has a thickness of 0.8-1.5 mm, a mesh grid size of 3 mm×8 mm-8 mm×15 mm, and a wire width of 1-2 mm. More preferably, the steel plate mesh has a thickness of 1 mm, a mesh grid size of 5 mm×10 mm, and a wire width of 1.6 mm.

Preferably, the vertical ring magnetic separator further comprises a pulsating mechanism, which is coupled with the tailing bucket via a rubber plate.

Preferably, the inductive medium is provided in the entire circle of the rotating ring.

When the above-said vertical ring magnetic separator is used for magnetic separation for de-ironing, it is necessary to timely test the iron content in the slurry subject to the magnetic separation. When the iron content in the slurry is equal to or lower than a predetermined value, the slurry is discharged; when the iron content is higher than the predetermined value, the slurry is returned to the feeding opening for further magnetic separation. Such magnetic separation may be repeated 2-4 times, preferably 2-3 times.

Preferably, when magnetically separating the slurry by the vertical ring magnetic separator, the vertical ring magnetic separator provides a magnetic field strength of 15,000 Gs or more, further preferably 15,000-20,000 Gs, more preferably 15,000-17,500 Gs.

In step a) according to an embodiment of the invention, the filter cake of the circulating fluidized-bed fly ash subject to magnetic separation is placed into an acid-resistant reactor and then the hydrochloric acid with a preferred concentration of 20-37 wt % is added therein to perform acid dissolving reaction. In a preferred embodiment, the molar ratio of HCl contained in the hydrochloric acid to alumina contained in the fly ash is 4:1-9:1.

Preferably, the fly ash and hydrochloric acid reacts at a temperature in the range of 100-200° C. and under a pressure in the range of 0.1-2.5 MPa and the reaction time is 0.5-4.0 hours. After the reaction is complete, the reaction product is subjected to a solid-liquid separation and rinse to yield an acid leachate having a pH value in the range of 1-3. The process for the solid-liquid separation may be any of conventional methods, such as settling separation, vacuum filtration, pressure filtration or centrifugation or the like.

In step b) according to an embodiment of the invention, said macro-porous cationic resin is preferably D001, 732, 742, 7020H, 7120H, JK008 or SPC-1 etc. The process for adsorbing the hydrochloric leachate may be any of conventional methods. However, it is preferred to conduct step b) in such a way that the hydrochloric leachate passes through the resin column from bottom to top at 20-90° C., such that the leachate flows upwards piston-like in the gaps of resin, with a volume flux of 1-4 times over resin volume per hour. The resin column may be single column or two cascaded columns.

The macro-porous cationic resin is eluted by eluting agent to obtain an eluent containing gallium when the adsorption reaches saturation. The eluting agent may be water or hydrochloric acid. In a preferred embodiment, the eluting agent is hydrochloric acid with a concentration of 2-10 wt %. In another preferred embodiment, when the macro-porous cationic resin is eluted by the eluting agent, the conditions of elution may include that the eluting temperature is 20-60° C., the amount of the eluting agent is 1-3 times over the volume of the resin, the volume flux of the eluting agent is 1-3 times over resin volume per hour, and the eluting agent passes through the resin column in a top-in and bottom-out way during the elution.

The macro-porous cationic resin may regain adsorption capacity by regenerating the eluted macro-porous cationic resin. Hydrochloric acid with a concentration of 2-10 wt % is used for regeneration in which the temperature is 20-60° C., the amount of the hydrochloric acid is 1-2 times over the volume of the resin, and the volume flux of the hydrochloric acid is 1-3 times over resin volume per hour and the hydrochloric acid passes through the resin column in a top-in and bottom-out way during the regeneration.

In step c) according to an embodiment of the invention, the masking agent can be one or more of sodium sulfite, iron powder, hydroxylamine hydrochloride and vitamin C. In a preferred embodiment, the molar ratio of masking agent to the iron ions contained in the eluent finally obtained from step b) is 1-2:1. When iron powder is used as the masking agent, the un-reacted iron powder needs to be removed from the eluent via solid-liquid separation after iron powder reacts with the eluent and then the eluent subject to the separation passes through the column loaded with resin.

In a preferred embodiment, in step c), said macro-porous cationic resin is D001, 732, 742, 7020H, 7120H, JK008 or SPC-1 resin.

In another preferred embodiment, in step c), the adsorption of the eluent containing masking agent via resin may comprises steps of passing the eluent through the column loaded with resin from the bottom to top at 20-90° C., with a volume flux of 1-4 times over resin volume per hour.

In another preferred embodiment, in step c), the concentration of the eluting agent (i.e. hydrochloric acid) is 2-10 wt % and the conditions of elution include that the eluting temperature is 20-60° C., the amount of the eluting agent is 1-3 times over the volume of the resin, the volume flux of the eluting agent is 1-3 times over resin volume per hour.

In steps b) and c) according to an embodiment of the invention, said macro-porous cationic resin may be strong-acid-cationic resin, such as styrene resins or acrylic resins. The essential performances of the resin include moisture content of 50.5-70.0%, exchange capacity of 3.60 mmol/g or more, volume exchange capacity of 1.20 mmol/g or more, bulk density in wet state of 0.60-0.80 g/ml, particle size of 0.315-1.250 mm, available particle size of 0.400-0.700 mm and maximum working temperature of 95° C.

In step d) according to an embodiment of the invention, preferably, sodium hydroxide solution is added into the secondary eluent under stirring condition and the concentration of sodium hydroxide solution is 180-245 g/l and the secondary eluent reacts with the sodium hydroxide solution at 20-100° C. In a preferred embodiment, the mass ratio of sodium hydroxide to alumina contained in the eluent is 1:1-2:1, such that the aluminum chloride and gallium chloride contained in the secondary eluent may react with sodium hydrochloride to produce sodium metaaluminate/sodium metagallate and a few ferric chloride precipitates in the form of ferric hydroxide. The reaction product is subjected to a solid-liquid separation rinse to yield a base solution containing aluminum and gallium.

In step d) according to an embodiment of the invention, the base solution containing aluminum and gallium is subjected to alkalinity-adjustment and concentration, such that both gallium content and sodium hydroxide content are 1 mol/l or more. Then, electrolysis is conducted to obtain metal gallium product. The preferred electrolytic parameters include platinum electrode as the negative and positive electrodes, electrolysis current of 180-200 mA/l, electrolysis voltage of 4V and electrolytic bath temperature of 35-45° C.

As compared with processes in the prior art, the advantages of the present invention are as the following aspects. The circulating fluidized-bed fly ash with high activity is adopted as the raw material for the invention and gallium is extracted from the fly ash via direct acid-leaching process, which saves the step of calcination and activation with presence of sodium carbonate at a very high temperature and thus simplifies the procedures and reduces the production cost. The acid leaching of the fly ash occurs in acid-resistant reactor at a moderate temperature (in the range of 100-200° C.), and thus the leaching efficiency of alumina is high, being 80% or more. The effective adsorption efficiency of gallium in hydrochloric leachate is 96% or more when macro-porous cationic resin is used for adsorbing gallium. The mass ratio of gallium to alumina in the eluent obtained by two times of adsorption via resin reaches 0.005 or more. During the enrichment of gallium in hydrochloric leachate via macro-porous cationic resin, the iron contained in the hydrochloric leachate is also effectively removed out, which creates advantageous conditions for the following preparation of alumina with high quality. The method is simple, the procedure is easy to be controlled, the extraction efficiency of gallium is high, the production coast is low, and the product quality is steady.

In addition, experimental study has indicated that, since the magnetic separation apparatus according to the present invention is used, the iron removing efficiency is improved by 20% or more, and the iron removing rate is improved from 60% to 80%, which significantly relieves the burden of de-ironing from solution in the subsequent processes, and thereby reducing the production cost and improving the production efficiency.

DETAILED DESCRIPTION OF THE INVENTION

Hereafter the method according to the present invention will be further described in detail with reference to the drawings, however, it should be understood that the present invention is not limited thereto in any way.

Figure 1:
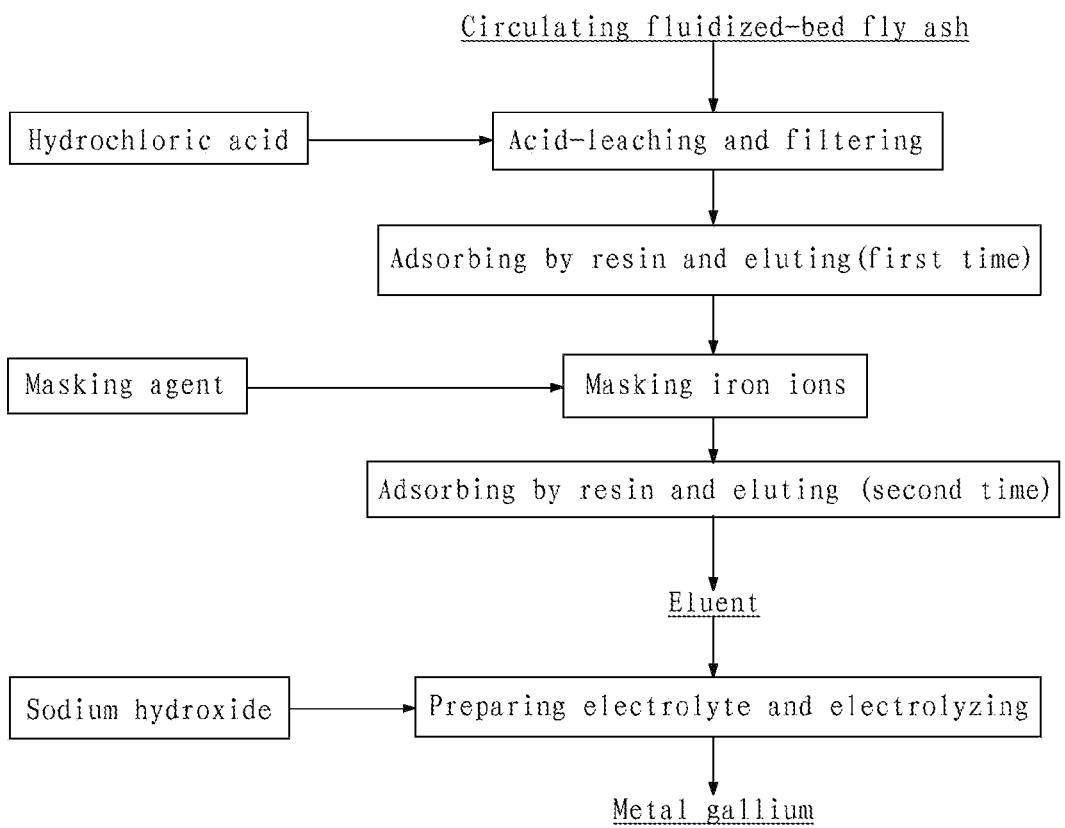
FIG. 1 is a flow diagram of the method according to the present invention.
Figure 2:
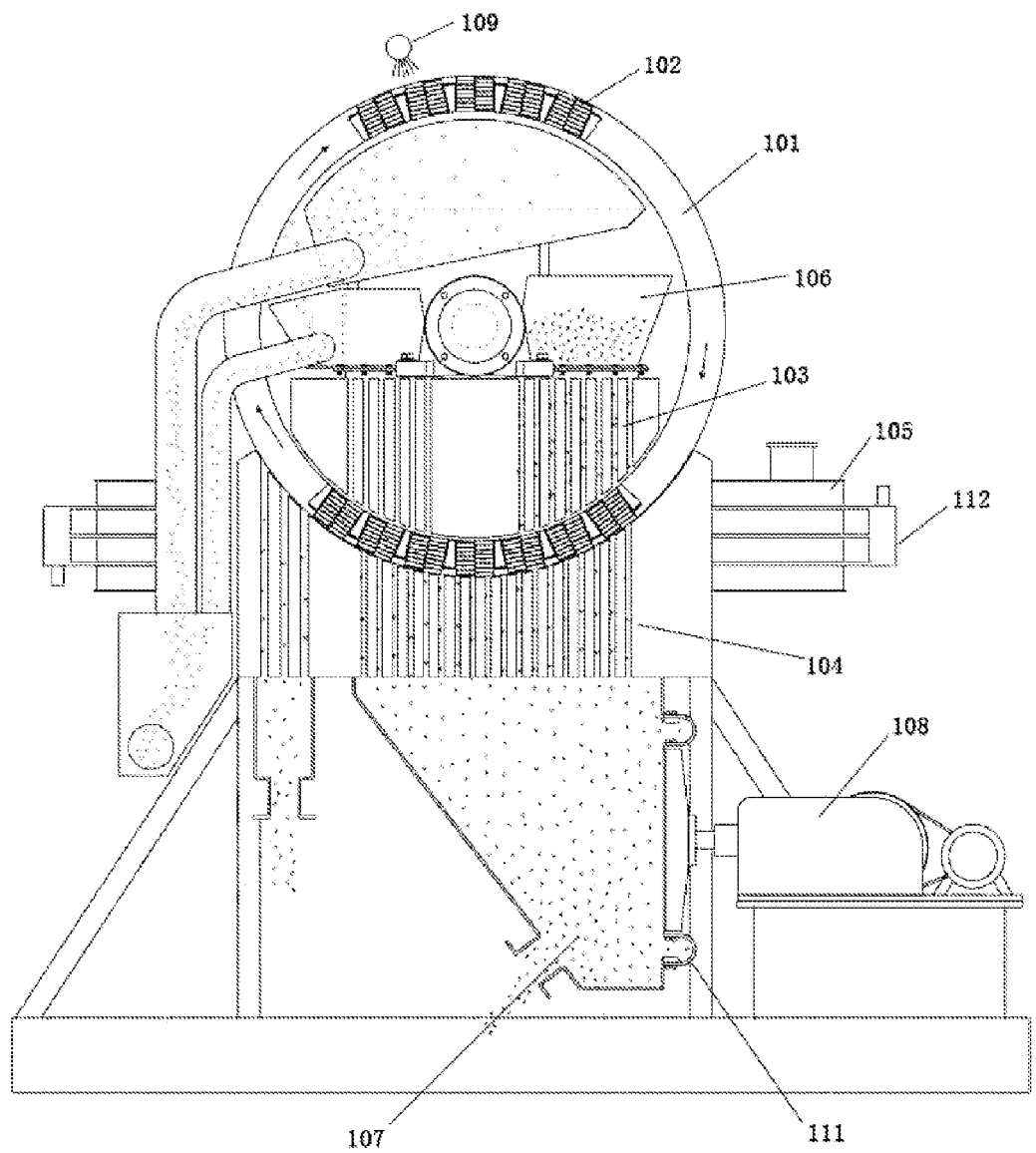
FIG. 2 is a schematic diagram of the vertical ring magnetic separator used in one preferred embodiment of the invention.

The structure of vertical ring magnetic separator used for the following examples is shown in FIG. 2. The vertical ring magnetic separator comprises a rotating ring 101, an inductive medium 102, an upper iron yoke 103, a lower iron yoke 104, a magnetic exciting coil 105, a feeding opening 106 and a tailing bucket 107, and also comprises a pulsating mechanism 108 and a water washing device 109.

The rotating ring 101 is a circular ring shaped carrier in which the inductive medium 102 is carried. When the rotating ring 101 is rotated, the inductive medium 102 and the matters adsorbed thereon move together, so as to separate the adsorbed matters. The rotating ring 101 may be made of any suitable material, such as carbon steel etc.

An electric motor or other driving device can provide power to the rotating ring 101 such that the rotating ring 101 can rotate in a set speed.

When parameters, such as iron content or treating amount of the material to be treated is lower than a predetermined value, a relatively low rotating speed, such as 3 rpm, may be used, in order to make the ferromagnetic impurities having sufficient time to be adsorbed onto the inductive medium meshes under the act of magnetic field, and being separated.

The inductive medium 102 is arranged in the rotating ring 101. The magnetic field generated by the magnetic exciting coil 105 makes the upper iron yoke 103 and the lower iron yoke 104 to be a pair of magnetic poles generating magnetic field along the vertical direction. The upper iron yoke 103 and the lower iron yoke 104 are arranged at the inner and outer sides of the lower portion of the rotating ring 101 such that the rotating ring 101 rotates between the magnetic poles. When the rotating ring 101 rotates, the inductive medium 102 in the rotating ring 101 will pass the pair of magnetic poles made up of the upper iron yoke 103 and the lower iron yoke 104 and be magnetized for removing the iron.

The inductive medium 102 may be layers of steel plate meshes. The steel plate meshes are made of 1Cr17. Each layer of steel plate meshes is woven by wires, with the mesh grid having a rhomb shape. The edges of the wires have ridge-like sharp angles. The upper iron yoke 103 is communicated with the feeding opening 106 and the lower iron yoke 104 is communicated with the tailing bucket 107 which is used for discharging materials. The steel plate meshes have a medium layer spacing of 3 mm. The magnetic exciting coil 105 is formed of flat wire solenoid coil which is aluminum coated by varnish and doubly enwrapped by fiberglass and is solid conductor. The current passing through the magnetic exciting coil 105 is continuously adjustable, and thus the strength of the magnetic field generated by the magnetic exciting coil 105 is also continuously adjustable.

The vertical ring magnetic separator further comprises a pulsating mechanism 108 coupled with the tailing bucket 107 via a rubber plate 111. The pulsating mechanism can be achieved by an eccentric link mechanism, such that the alternating force generated by the pulsating mechanism 108 pushes the rubber plate 111 to move forth and back, it is possible for the mineral slurry in the tailing bucket 107 to generate pulsations.

The water washing device 109 is arranged above the rotating ring 101, for flushing the magnetic particles into the concentrate hopper by water flow. The water washing device 109 may be various suitable flushing or spraying device, such as a spraying nozzle, water pipe, etc.

The feeding opening 106 is communicated with a side of the upper iron yoke 103, such that the fly ash can pass through the rotating ring. The feeding opening 106 may be a feeding hopper or a feeding pipe. The feeding opening 106 is configured for feeding the mineral slurry, such that the mineral slurry enters the upper iron yoke 103 with a relatively small fall for preventing the magnetic particles from penetrating the inductive medium 102 due to gravity, thus improving the effect of magnetically separating and impurities removing.

The vertical ring magnetic separator further comprises a cooling device 112, which is provided adjacent to the magnetic exciting coil for decreasing the working temperature of the magnetic exciting coil. The cooling device is a pressure balance chamber water jacket. The pressure balance chamber water jacket is made of stainless steel material, and thus is not prone to scale. As pressure balance chambers are respectively mounted to the inlet and outlet of the water jacket, they ensure that the water flows uniformly through each layer of water jacket and fills throughout the inside of the jacket, thus preventing any local water from taking a shortcut which otherwise would affect heat dissipation. Each layer of water jacket has a water passage with a large cross-section area, and thus it is possible to completely avoid blocking due to scaling. Even if there is a block somewhere, the normal flowing of the circulating water in the water jacket will not be affected. Moreover, the water jacket is in close contact with the coil by a large contacting area, thus most heat generated by the coil can be taken away by the water flow.

The pressure balance chamber water jacket, as compared with the common hollow copper tube for heat dissipation, shows high heat dissipation efficiency, small temperature rise of the windings, and low exciting power. In case of a rated exciting current of 40 A, the magnetic separator with the pressure balance chamber water jacket for heat dissipation can be reduced from 35 kw to 21 kw.

When the magnetic separator apparatus is working, the fed mineral slurry flows along a slot of the upper iron yoke 103 then through the rotating ring 101. As the inductive medium 102 in the rotating ring 101 is magnetized in the background magnetic field, a magnetic field with very high magnetic induction strength (such as 22,000 Gs) is formed at the surface of the inductive medium 102. The magnetic particles in the mineral slurry, under the effect of the very high magnetic field, are adhered to the surface of the inductive medium 102, and rotated with the rotating ring 101 going into the region without magnetic field at top of the rotating ring 101. Then, the magnetic particles are flushed into the concentrate hopper by the water washing device 109 located above the top of the rotating ring. The non-magnetic particles flow along the slots of the lower iron yoke 104 into the tailing bucket 107 and then are discharged via a tailing exit of the tailing bucket 107.

Hereafter the method according to the present invention will be further described in detail with reference to the Examples, however, it should be understood that the present invention is not limited thereto in any way.

In the following Examples, the circulating fluidized-bed fly ash discharged by a thermal power plant is used as the raw material and its chemical components are shown in Table 1. The gallium content in the fly ash is 0.0042 wt %.

TABLE 1

| Chemical components of circulating fluidized-bed fly ash (wt %) | | | | | | | | | | | |
|---|---|---|---|---|---|---|---|---|---|---|---|
| $SiO_2$ | $Al_2O_3$ | $TiO_2$ | CaO | MgO | $TFe_2O_3$ | FeO | $K_2O$ | $Na_2O$ | LOS | $SO_3$ | Total |
| 34.70 | 46.28 | 1.48 | 3.61 | 0.21 | 1.54 | 0.22 | 0.39 | 0.17 | 7.17 | 1.32 | 95.77 |

EXAMPLE 1

The experimental procedures used in the example are as follows.

(1) Crushing the circulating fluidized-bed fly ash to a size of 200 mesh, removing iron by wet magnetic separation using the vertical magnetic separator as illustrated in FIG. 2, such that the ferric oxide content in the fly ash was reduced to 0.8 wt %; putting the filter cake of the fly ash obtained after magnetic separation into an acid-resistant reactor and adding industrial hydrochloric acid having a concentration of 37 wt % therein to perform acid dissolving reaction, wherein the molar ratio of HCl contained in the hydrochloric acid to alumina contained in the fly ash was 4.5:1, the reaction temperature was 150° C., the reaction pressure was 2.1 MPa and the reaction time was 2 h; and then pressure-filtering the discharged reaction product by a plate-and-frame filter press and then washing to yield a hydrochloric leachate having pH of 1.7, wherein the leaching efficiency of gallium from the fly ash was measured to be 84.2%;

(2) cooling the hydrochloric leachate till its temperature was 65° C. by means of heat-exchange, then pumping the hydrochloric leachate through a corrosion-resistant pump into the resin column (single-column loaded with D001 Resin (Anhui Wandong Chemical Plant)) to enrich gallium, wherein the flow flux of the hydrochloric leachate was 2 times over resin volume per hour; when the adsorption reached saturation, eluting the resin column with 4 wt % hydrochloric acid as the eluting agent at 25° C. to obtain a gallium-rich eluent, wherein the flow flux of the hydrochloric acid was 2 times over resin volume per hour, and the total amount of the eluting agent used for elution was 2 times over the volume of the resin; and regenerating the resin with 4 wt % hydrochloric acid, wherein the adsorption efficiency of gallium in the acid leachate was measured to be 96.4%;

(3) adding 5 wt % sodium sulfite into the gallium-rich eluent as a masking agent of iron ion under stirring, wherein the molar ratio of the masking agent to iron ions contained in the eluent was 1:1;

(4) further enriching gallium in the eluent after iron-masking as in step (2, wherein the mass ratio of gallium to alumina contained in the eluent obtained in this step was measured to be 0.005 after twice enrichments;

(5) adding sodium hydroxide solution with a concentration of 180 g/l into the eluent obtained in step (4), such that the mass ratio of sodium hydroxide to alumina contained in the eluent was 2:1, reacting at 25° C. and subjecting the reaction product to filtration and rinse to obtain a base solution rich of gallium; then adjusting the gallium content to 1.3 mol/l and conducting electrolysis with platinum electrodes as the negative and positive electrodes, electrolysis current of 200 mA/l, electrolysis voltage of 4V and electrolytic bath temperature of 40° C. to obtain metal gallium product. The gallium content in the product was measured to be 99.9% according to the method of "YS/T520-2007 Methods for Chemical Analysis of Gallium".

EXAMPLE 2

The operation conditions were the same as those of Example 1 except step (1). Step (1) was adjusted as follows:

Crushing the circulating fluidized-bed fly ash to a size of 150 mesh, removing iron by wet magnetic separation using the vertical magnetic separator as illustrated in FIG. 2, such that the ferric oxide content in the fly ash was reduced to 0.8 wt %; putting the filter cake of the fly ash obtained after magnetic separation into an acid-resistant reactor and adding industrial hydrochloric acid having a concentration of 28 wt % therein to perform acid dissolving reaction, wherein the molar ratio of HCl contained in the hydrochloric acid to alumina contained in the fly ash was 5:1, the reaction temperature was 150° C., the reaction pressure was 1.0 MPa and the reaction time was 2 h; and then pressure-filtering the discharged reaction product by a plate-and-frame filter press and then washing to yield a hydrochloric leachate having pH of 1.5, wherein the leaching efficiency of gallium from the fly ash was measured to be 82.8%.

The gallium content in the obtained product was measured to be 99.9%.

EXAMPLE 3

The operation conditions were the same as those of Example 1 except step (1). Step (1) was adjusted as follows:

Crushing the circulating fluidized-bed fly ash to a size of 200 mesh, removing iron by wet magnetic separation using the vertical magnetic separator as illustrated in FIG. 2, such that the ferric oxide content in the fly ash was reduced to 0.8 wt %; putting the filter cake of the fly ash obtained after magnetic separation into an acid-resistant reactor and adding industrial hydrochloric acid having a concentration of 20 wt % therein to perform acid dissolving reaction, wherein the molar ratio of HCl contained in the hydrochloric acid to alumina contained in the fly ash was 8:1, the reaction temperature was 100° C., the reaction pressure was 0.1 MPa and the reaction time was 4 h; and then pressure-filtering the discharged reaction product by a plate-and-frame filter press and then washing to yield a hydrochloric leachate having pH of 1.4, wherein the leaching efficiency of gallium from the fly ash was measured to be 80.1%.

The gallium content in the obtained product was measured to be 99.9%.

EXAMPLE 4

The operation conditions were the same as those of Example 1 except step (2). Step (2) was adjusted as follows:

Cooling the hydrochloric leachate till its temperature was 90° C. by means of heat-exchange, then pumping the hydrochloric leachate through a corrosion-resistant pump into the resin columns (two columns in series loaded with JK008 Resin (Anhui Wandong Chemical Plant)) to enrich gallium, wherein the flow flux of the hydrochloric leachate was 4 times over resin volume per hour; and when the adsorption reached saturation, eluting the resin columns with 2 wt % hydrochloric acid as the eluting agent at 60° C. to obtain a gallium-rich eluent, wherein the flow flux of the hydrochloric acid was 1 time over resin volume per hour, and the total amount of the eluting agent used for elution was 2 times over the volume of the resin, wherein the adsorption efficiency of gallium in the acid leachate was measured to be 96.9%.

The gallium content in the obtained product was measured to be 99.9%.

EXAMPLE 5

The operation conditions were the same as those of Example 1 except step (2). Step (2) was adjusted as follows:

Cooling the hydrochloric leachate till its temperature was 70° C. by means of heat-exchange, then pumping the hydrochloric leachate through a corrosion-resistant pump into the resin column (single-column loaded with 732 Resin (Anhui Sanxing Resin Ltd., Co)) to enrich gallium, wherein the flow flux of the hydrochloric leachate was 1 time over resin volume per hour; and when the adsorption reached saturation, eluting the resin column with water as the eluting agent at 60° C. to obtain a gallium-rich eluent, wherein the flow flux of the water was 1 time over resin volume per hour, and the total amount of the eluting agent used for elution was 3 times over the volume of the resin and the adsorption efficiency of gallium in the acid leachate was measured to be 96.2%.

The gallium content in the obtained product was measured to be 99.9%.

EXAMPLE 6

The operation conditions were the same as those of Example 1 except step (2). Step (2) was adjusted as follows:

Cooling the hydrochloric leachate till its temperature was 40° C. by means of heat-exchange, then pumping the hydrochloric leachate through a corrosion-resistant pump into resin column (single-column loaded with SPC-1 Resin (Shanghai Resin Plant)) to enrich gallium, wherein the flow flux of the hydrochloric leachate was 1 time over resin volume per hour; and when the adsorption reached saturation, eluting the resin column with 10 wt % hydrochloric acid as the eluting agent at 30° C. to obtain a gallium-rich eluent, wherein the flow flux of the hydrochloric acid was 3 times over resin volume per hour, and the total amount of the eluting agent used for elution was 1 times over the volume of the resin and the adsorption efficiency of gallium in the acid leachate was measured to be 96.5%.

The gallium content in the obtained product was measured to be 99.9%.

EXAMPLE 7

The operation conditions were the same as those of Example 1 except step (3). Step (3) was adjusted as follows:

Adding iron powder into the gallium-rich eluent as the masking agent under stirring, wherein the molar ratio of the masking agent to iron ions contained in the eluent was 2:1, and then removing un-reacted iron powder via solid-liquid separation.

The gallium content in the obtained product was measured to be 99.9%.

EXAMPLE 8

The operation conditions were the same as those of Example 1 except step (3). Step (3) was adjusted as follows:

Adding 3 wt % aqueous solution of vitamin C into the gallium-rich eluent as the masking agent under stirring, wherein the molar ratio of the masking agent to iron ions contained in the eluent was 1.5:1.

The gallium content in the obtained product was measured to be 99.9%.

EXAMPLE 9

The operation conditions were the same as those of Example 1 except step (5). Step (5) was adjusted as follows:

Adding sodium hydroxide solution with a concentration of 240 g/l to the eluent obtained in step (4), such that the mass ratio of sodium hydroxide to alumina contained in the eluent is 1:1, reacting at 90° C. and subjecting the reaction product to filtration and rinse to obtain a base solution rich of gallium; then adjusting the gallium content to 1.1 mol/l and conducting electrolysis with platinum electrodes as the positive electrode, electrolysis current of 180 mA/l, electrolysis voltage of 4V and electrolytic bath temperature of 40° C. to obtain metal gallium product.

The gallium content in the obtained product was measured to be 99.9%.

The invention claimed is:

1. A method for extracting gallium from fly ash, comprising the following steps:
  a) crushing the fly ash to a size of 100 mesh or smaller, removing iron by wet magnetic separation such that the ferric oxides content in the fly ash is reduced to 1.0 wt % or less, then adding hydrochloric acid into the de-ironed fly ash for an acid-leaching reaction, and subjecting the reaction product to solid-liquid separation, so as to yield a hydrochloric leachate having a pH value in the range of 1-3;
  b) adsorbing gallium in the hydrochloric leachate by passing the same through a column loaded with a strongly acidic styrene-based cation-exchange resin; eluting the column with water or hydrochloric acid as an eluting agent when the adsorption reaches saturation to obtain a gallium-containing eluent;
  c) masking ferric ions in the gallium-containing eluent by a masking agent followed by passing the masked eluent through the column loaded with a strongly acidic styrene-based cation-exchange resin; eluting the column with water or hydrochloric acid as an eluting agent when the adsorption reaches saturation to obtain a second eluent; and
  d) adding an alkali solution into the second eluent, removing precipitates by filtering after reaction, and concentrating the filtrate till both gallium content and sodium hydroxide content are 1 mol/l or more, then electrolyzing the concentrated filtrate to obtain metal gallium,
  wherein in the acid-leaching reaction of step a), the reaction temperature is 100-200° C., the reaction pressure is 0.1-2.5 MPa.

2. The method according to claim 1, wherein, in step a), the concentration of the hydrochloride acid of is 20-37 wt %; the molar ratio of HCl contained in the hydrochloric to alumina contained in the fly ash is 4:1-9:1.

3. The method according to claim 2, wherein, in the acid-leaching reaction of step a), the reaction pressure is 0.1-2.5 MPa, and the reaction time is 0.5-4.0 hours.

4. The method according to claim 3, wherein, in step b), adsorbing gallium in the hydrochloric leachate by passing the hydrochloric leachate through the column from the bottom to top with a volume flux of 1-4 times over resin volume per hour at 20-90° C.

5. The method according to claim 1, wherein, in steps b) and c), eluting the column with 2-10 wt % hydrochloric acid as an eluting agent, and wherein the eluting temperature is 20-60° C., the amount of the eluting agent used is 1-3 times over the volume of the resin, and the eluting rate is 1-3 times over resin volume per hour.

6. The method according to claim 1, wherein, in step c), the masking agent is one or more selected from the group consisting of sodium sulfite, iron powder, hydroxylamine hydrochloride and vitamin C; preferably, in step c), the molar ratio of the masking agent to the iron ions contained in the eluent obtained from step b) is 1-2:1.

7. The method according to claim 6, wherein, in step c), passing the masked eluent through the column from the bottom to top at 20-90° C., with a volume flux of 1-4 times over resin volume per hour.

8. The method according to claim 1, wherein, in step d), the alkali solution is sodium hydroxide solution, the concentration of which is 180-245 g/l; the mass ratio of sodium hydroxide to alumina contained in the second eluent is 1:1-2:1.

9. The method according to claim 1, wherein, in step d), platinum electrodes are used as the negative and positive electrodes for electrolyzing to obtain metal gallium.

10. The method according to claim 1, wherein, in step a), the apparatus used for removing iron by wet magnetic separation is a vertical ring magnetic separator which comprises a rotating ring, an inductive medium, an upper iron yoke, a lower iron yoke, a magnetic exciting coil, a feeding opening, a tailing bucket and a water washing device, wherein the feeding opening is used for feeding the fly ash to be de-ironed, the tailing bucket is used for discharging the non-magnetic particles after de-ironing, the upper iron yoke and the lower iron yoke are respectively arranged at the inner and outer sides of the lower portion of the rotating ring, the water washing device is arranged above the rotating ring, the inductive medium is arranged in the rotating ring, the magnetic exciting coil is arranged at the periphery of the upper iron yoke and the lower iron yoke so as to make the upper iron yoke and the lower iron yoke to be a pair of magnetic poles for generating a magnetic field in the vertical direction, and wherein the inductive medium is layers of steel plate meshes, each steel plate mesh is woven by wires, and the edges of the wires have ridge-like sharp angles.

11. The method according to claim 10, wherein the vertical ring magnetic separator further comprises a pressure balance chamber water jacket disposed adjacent to the magnetic exciting coil.

12. The method according to claim 11, wherein the steel plate mesh has a medium layer spacing of 2-5 mm; the steel plate mesh is made of 1Cr17.

13. The method according to claim 12, wherein the steel plate mesh has a thickness of 0.8-1.5 mm, a mesh grid size of 3 mm×8 mm-8 mm×15 mm, and a wire width of 1-2 mm.

14. The method according to claim 13, wherein the vertical ring magnetic separator further comprises a pulsating mechanism, which is coupled with the tailing bucket via a rubber plate.

15. The method according to claim 14, wherein the inductive medium is provided in the entire circle of the rotating ring.

16. The method according to claim 15, wherein the magnetic exciting coil is a flat wire solenoid coil which is aluminum coated by varnish and doubly enwrapped by fiberglass.

17. The method according to claim 16, wherein the magnetic field strength of the vertical ring magnetic separator is 15,000 Gs or more.

18. The method according to claim 8, wherein in step d) the reaction temperature is 20-100° C.

19. The method according to claim 12, wherein the steel plate mesh has a medium layer spacing of 3 mm.

20. The method according to claim 13, wherein the steel plate mesh has a thickness of 1 mm, a mesh grid size of 5 mm×10 mm, and a wire width of 1.6 mm.

21. The method according to claim 17, wherein the magnetic field strength of the vertical ring magnetic separator is 15,000 to 20,000 Gs.

22. The method according to claim 21, wherein the magnetic field strength of the vertical ring magnetic separator is 15,000 to 17,500 Gs.

* * * * *